Jan. 23, 1968 R. E. LATHAM ET AL 3,365,168
ROTARY VALVE HAVING CAMMED ACTUATED BALL VALVING MEMBERS
Filed June 30, 1965 2 Sheets-Sheet 1

INVENTORS
RAYMOND E. LATHAM
OSCAR DANE
BY Cushman, Darby & Cushman
ATTORNEYS

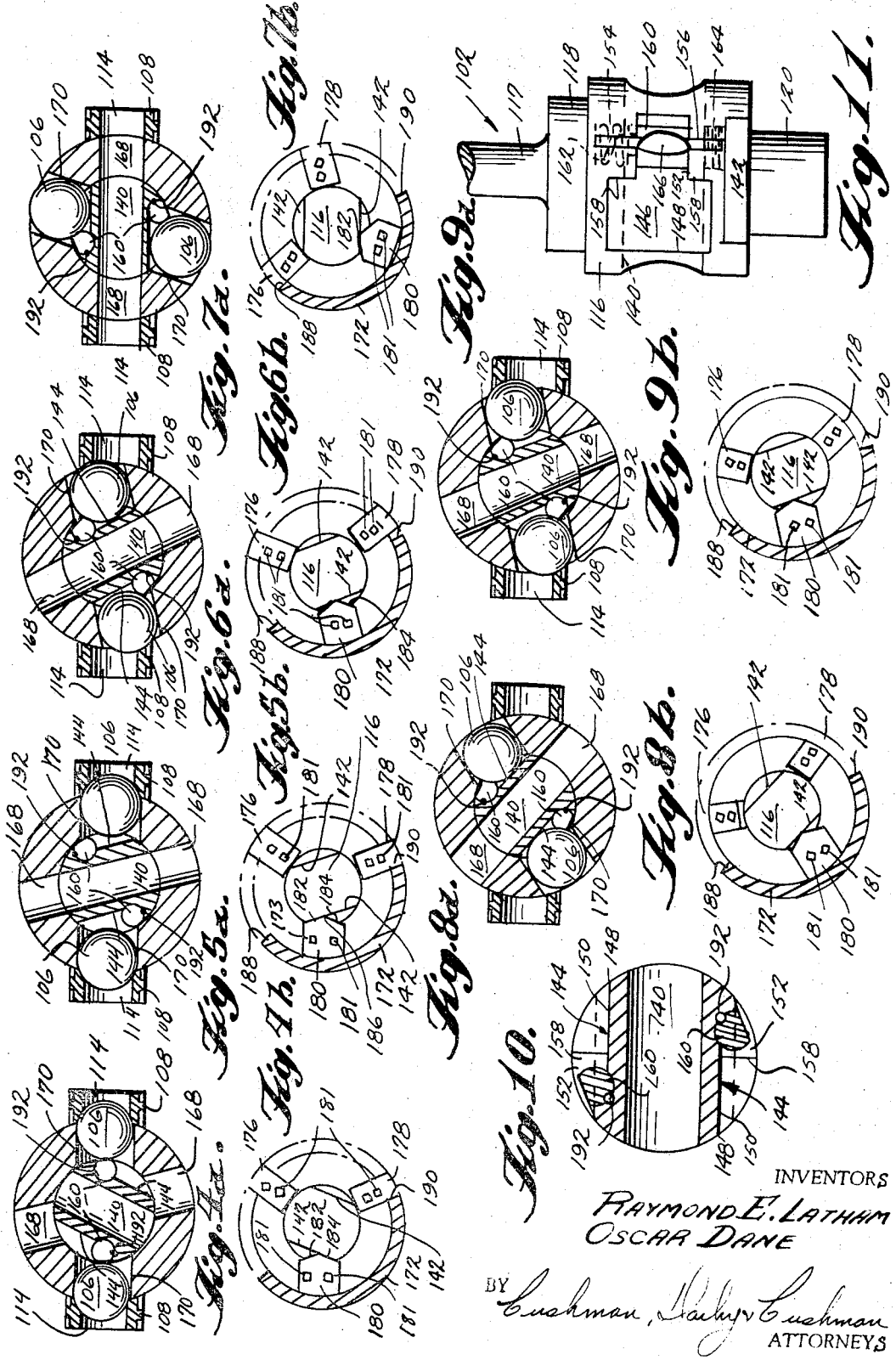

United States Patent Office 3,365,168
Patented Jan. 23, 1968

3,365,168
ROTARY VALVE HAVING CAMMED ACTUATED
BALL VALVING MEMBERS
Raymond E. Latham and Oscar Dane, Houston, Tex., assignors to Gray Tool Company, Houston, Tex., a corporation of Texas.
Filed June 30, 1965, Ser. No. 468,262
14 Claims. (Cl. 251—188)

ABSTRACT OF THE DISCLOSURE

The valve includes a rotatable core, an annular ball carrier circumferentially surrounding at least a portion of the core, means for keying the ball carrier to the core for rotation therewith and provision for relative rotation between the carrier and core, alignable throughbores in the carrier and core, ball receiving openings in the carrier, balls received in the openings and radially movable therein toward and away from the seats of said valve, and means on the core for urging the balls radially outwardly into sealing contact with the seats.

The foregoing abstract is not intended to be a comprehensive discussion of all of the principles, possible modes or applications of the invention disclosed in this document and should not be used to interpret the scope of the claims which appear at the end of this specification.

---

The present invention relates to valves and more particularly block valves having an in line full bore and which are especially well suited for controlling the flow of ultra highly pressurized fluid.

A primary object of the invention is the provision of a valve which is operable between its opened and closed positions with low torque, which can be locked in a closed position regardless of the pressure incumbent upon the valve, whose moving parts are self-aligning in response to temperature and pressure changes and which is comparatively inexpensive to produce because relatively large tolerances may be adequate in its manufacture when compared to prior art ultra high pressure valves.

Another object of the invention is the provision of a valve of the type described which includes a rotatable core, an annular ball carrier circumferentially surrounding at least a portion of the core, means for keying the ball carrier to the core for rotation therewith and provision for relative rotation between the carrier and core, alignable throughbores in the carrier and core, ball receiving openings in the carrier, balls received in the openings and radially movable therein toward and away from the seats of said valve, and means on the core for urging the balls radially outwardly into sealing contact with the seats.

A further object of the invention is the provision in a valve of the type described of an operating mechanism having a small shaft diameter to minimize the necessary seal area subject to ultra high pressure and which is rotatable through a small angle, less than 90 degrees to transpose the valve between the fully open and closed locked positions thereof.

These and further objects of the present invention as well as the principles and scope of applicability thereof will become more clearly apparent from a reading of the following detailed description which relates to the preferred embodiments of the present invention that are depicted in the attached drawings.

In the drawings:

FIGURES 4a through 9a are transverse cross-sectional views taken substantially along line a—a of FIGURE 3 showing sequences of opening and closing of the valve;

Figure 3:
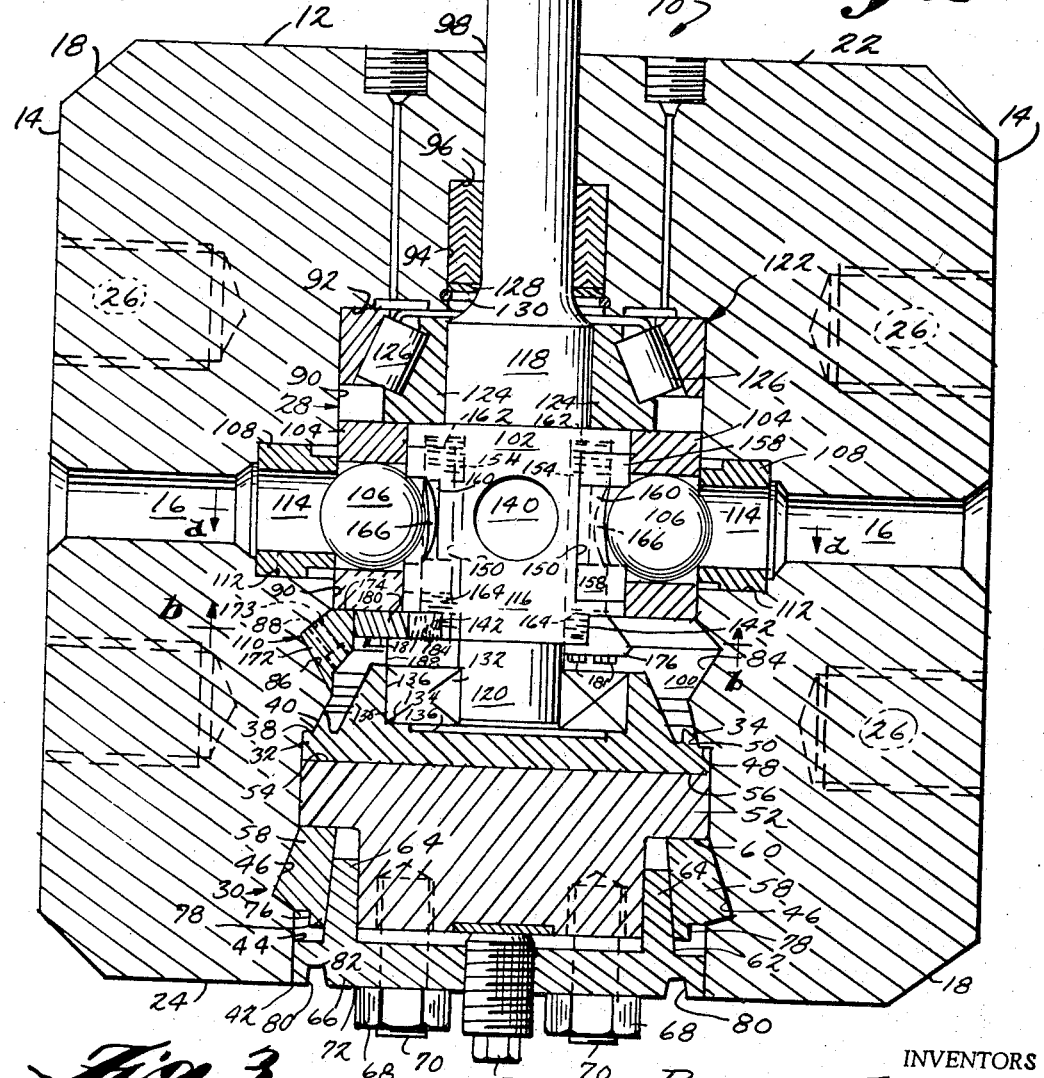
FIGURE 3 is a vertical longitudinal sectional view of the valve of FIGURES 1 and 2 taken substantially along line 3—3 of FIGURE 2.

FIGURES 4b through 9b are transverse cross-sectional views taken substantially along line 6—6 of FIGURE 3 in sequence corresponding to those of FIGURES 4a through 9a;

FIGURE 10 is a transverse sectional view of the valve core of the valve of FIGURE 3, taken substantially along line a—a of FIGURE 3 and drawn to an enlarged scale; and FIGURE 11 is a fragmentary elevation view of the valve core of the valve shown in FIGURE 3 drawn to an enlarged scale.

Figure 1:
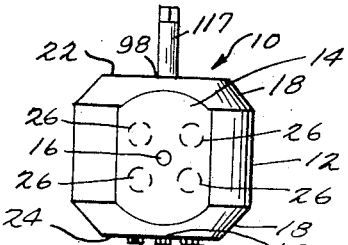
FIGURE 1 is an end elevation view of a valve according to the present invention drawn to a reduced scale.
Figure 2:
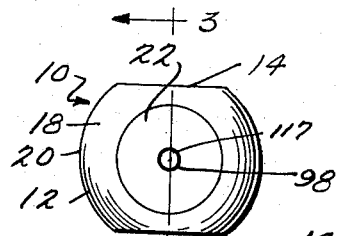
FIGURE 2 is a top plan view of the valve of FIGURE 1, also drawn to a reduced scale.

The valve 10 shown in FIGURES 1-3 includes a housing 12 that is shown as a steel casting or the like which, depicted as being generally cylindrical in plan but for having flat faces 14 thereon at the opposite ends of the flow passage 16 of the valve and chamfers 18 at the apices of the cylindrical sidewalls 20 and disk-like top and bottom surfaces 22, 24 of the housing 12.

As shown best in FIGURES 1 and 3, a plurality of threaded sockets 26 are formed in the housing 12 which peripherally surround the opposite ends of the flow passage 16 and open outwardly of the opposed faces 14. The sockets 26 are provided for effecting securement of the radially flanged ends of thick walled inlet and outlet conduits (not shown) to the valve using bolts or the like. Suitable sealing material is intended to be interposed between the conduit flanges and the faces 14. Alternative securement means could be employed.

Intermediate its outer ends, the streamlined flow passage 16 is intersected by a bore 28 extending perpendicular thereto and coaxially with the housing top and bottom surfaces 22, 24. Though generally cylindrical in transverse cross-section, the bore 28 undergoes several enlargements and reductions in radius throughout its length and although it is described as a "bore" the term is not utilized in a narrow sense indicative of the manner in which the opening is formed since it may be formed by diverse methods including coring and machining which form no part of the present invention.

The bore 28 is shown closed at its lower end by a wedge type head closure 30 as disclosed in the commonly assigned copending application of Raymond E. Latham, Robert T. Brown, Oscar Dane III and Charles A. Bollfrass, Ser. No. 414,245, filed Nov. 27, 1964, now U.S. Patent 3,307,735, whose disclosure is now expressly incorporated in this specification by reference.

The closure assembly 30 includes an inner disk 32 having a coaxial, longitudinally extending flexible lip 34 of elastic hard metal or the like integrally projecting from the outer peripheral region of the inwardly presented face 36 thereof. Between the lip 34 and the outer peripheral edge of the face 36 a narrow annular shoulder 38 is defined on the face 36. The lip 34 includes a radially outwardly facing conically tapered annular sealing surface 40 which diminishes in radius as it extends away from the face 36.

The bore 28 proceeding from the lower end 42 thereof includes a cylindrically curved section 44 interrupted intermediate its ends by an annular groove 46 of generally acute scalene triangular cross-section with the short side thereof positioned lowermost and the hypotenuse radially innermost.

At its inner end the section 44 intersects a radially extending, annular, downwardly facing shoulder 48 of approximately equal radial extent to the shoulder 38 of the disk 32. At the radially inner extent of the shoulder 48, the latter is intersected by an annular conically curved radially inwardly facing sealing surface 50 which increases in radius toward the lower end 42 of the bore 28.

Preferably, when the lip 34 is in an unstressed condition the lip sealing surface 40 extends at a slightly more acute angle with respect to the longitudinal axis of the bore 28 than does the sealing surface 50. When the disk 32 is brought to the position shown in FIGURE 3 contact of the surface 40 with the surface 50 results in deflection of the lip 34 until the surfaces 40 and 50 are in coextensive surface to surface stressed sealing engagement. The shoulders 38 and 48 are positioned to engage one another when the condition just mentioned has been achieved in order to preclude the possibility of deflection of the lip 34 beyond its elastic limit, as such would limit reusability of the disk 32 and make the seal susceptible to leakage upon sudden changes in pressure and/or temperature differential across the seal. As it is, the construction shown is highly resistant to leakage upon the event of such changes. As disclosed in the above-mentioned copending application, the disk 32 is backed up by a relatively thick pressure head closure 52 which has a flat forward surface 54 in engagement with the rear face 56 of the disk 32 in order to prevent bulging of the same such as would disturb the seal.

The pressure head closure 52 is utilized to urge the disk lip sealing surface 40 into sealing engagement with the surface 50 by a camming arrangement which includes a plurality of complementary arcuate wedges 58 receivable upon the rear surface 60 of the closure 52 and displaceable into the groove 46 by the conically tapered outer surface 62 of the longitudinally directed flange 64 of the invertible camming device 66. The amount of camming force is regulated by manipulation of the nuts 68, threadably received on screws 70 which are received in threaded sockets in the closure 52 and project outwardly through openings in the device 66. The nuts 68 bear against the surface 72 of the device 66.

In order to retract the wedges 58, the nuts 68 are loosened, the jack screw 74 employed to jack the device 66 away from the closure 52, the device 66 inverted and the nuts 68 retightened. In so doing the radially outwardly facing conically curved surfaces 76 on the longitudinally outwardly extending flanges 78 are engaged by the complementarily curved surface 80 in the annular recess 82 in the device surface 72 resulting in sufficient radially inward movement of the wedges 58 to loosen them from engagement with the groove 46 surfaces so the wedges can easily be radially retracted and removed.

Beyond the inner end of the bore sealing surface 50 a second annular groove 84 of acute scalene triangular cross-section having its hypotenuse presented radially inwardly and its longer side 86 lowermost. The inner, uppermost end of the shorter side 88 of the groove 84 joins an upwardly extending cylindrically curved bore portion 90 which is intersected by the flow passageway 16 intermediate its extent. The portion 90 terminates in a juncture with the radially outer extent of a downwardly facing radially directed annular shoulder 92. At the radially inner extent of the latter shoulder a cylindrically curved bore section 94 intersects the same and projects upwardly, undergoes a shoulder defining reduction in cross-sectional area at 96 and terminates in an opening 98 at the top of the housing.

In the chamber 100 defined in the bore 28 between the closure assembly 30 and the bore upper end 98 are received the major valve operating components which include the core 102 and its bearings, the ball carrier 104, the balls 106, the valve seats 108 and the core and carrier keying and stop assembly 110.

Adjacent and leading to the intersections of the flow passage 16 with the bore 28 the flow passage 16 is radially enlarged at 112 and slidably receive removable annular valve seats 108. The openings 114 through the latter are coaxial with the flow passage 16 and preferably about equal in radius thereto. The inner faces of the seats 108 are lapped circumferentially of the openings 114 to mate with the balls 106 when the valve is in a closed condition as will be described.

As shown best in FIGURES 3 and 11 the core 102 includes a generally cylindrical enlarged lower portion 116 having somewhat smaller radius bearing receiving surfaces 118 and 120 immediately thereabove and therebelow respectively. The relatively small diameter valve stem 117 integrally projects above the surface 118 coaxially with the surfaces 118, 120 and enlarged portion 116. In FIGURE 3, the core 102 is shown received in the chamber 100 so that the stem projects upwardly and out of the housing through the opening 98. A bearing 122 including a radially inner race 124, tapered rollers 126 and a radially outer race is shown mounted between the surface 118 and the bore portion 90 and shoulder 92. Pressure energized chevron packing is received in the larger diameter portion of the bore section 94 surrounding the stem and radially expanded to sealing condition by an internal packing gland 128, held in place by a groove received snap ring 130 or the like, thus eliminating cumbersome bolting which would be necessary were the packing installed from the outside of the housing. The ease of assembly and disassembly of the valve 10 by virtue of the closure assembly 30 above described more than compensates for the external inaccessability of the packing assembly just described.

The lower end of the core 102 is journalled in a thrust bearing 132 having the radially inner race thereof received against the surface 120 and the radially outer race outer and lower edges supported in a cylindrical well 134 defined on the inner face 36 of the disk 32 by the radially inner surface 136 of the annular, axially upwardly extending flange 138 formed on the disk 32 radially inwardly of, spaced from and coaxial with the flexible lip 34. The flange 138 has a substantially greater section modulus than does the lip 34 so it is relatively inflexible and it provides further stiffness for the disk adjacent the lip 34 to ensure that flexing of the lip does not appreciably distort the remainder of the disk 32.

The core enlarged portion 116, best illustrated in FIGURES 3, 4a–9a, 10 and 11 has a cylindrical opening 140 transversely therethrough which is axially alignable with the housing flow passage 16 in the open condition of the valve 10.

A pair of diametrically opposed sector shaped portions have been removed from the core adjacent the lower end of the portion 116 to define a pair of flats or lands 142 whose vertical walls are parallel to the longitudinal axis of the opening 140. Spaced vertically above the flats 142 are opposed recesses 144 configured to each receive a ball 106 in certain sequences of the valve operation as will be described.

The recesses 144 to be described are identical but proceed in opposite sense along diametrically opposed sides of the portion 116 so that for all positions of the core, corresponding portions of the two recesses 144 are adjacent corresponding portions of the ball carrier and the housing 12.

Each recess 144 includes a first, wider, arcuately extending portion 146 which joins the cylindrical surface of the portion 116 at a line 148 parallel to the longitudinal axis of the valve stem 117 and proceeds along a planar rear surface 150 which is parallel to the flats 142. Each portion 146 proceeds throughout approximately one eighth of the peripheral extent of the core portion 116.

At the opposite arcuate end of each recess portion 146 from the line 148 thereof, the portion 146 merges into a recess portion 152, having the same planar rear surface 150 but a shorter axial extent. The horizontal centerline of each recess portion 146 coincides with the horizontal centerline of the recess portion 152 into which it merges. The latter portions extend throughout about one sixteenth the peripheral extent of the core portion 116. Two cylindrical wells 154 are formed in the core portion 116 from the lower end thereof and extend upwardly to just below the upper end of the core portion 116. The outer edges of the wells 154 are shown in FIGURE 3 being approximately tangent with the peripheral surface of the core portion 116 so that a gap 156 is formed at the intersection of each well 154 with the core portion 116 peripheral surface. In the embodiment shown, the longitudinal centerline of each vertical well 154 is displaced 22 degrees from an imaginary plane passing through the longitudinal axis of the core 102 and the radially extending shoulders 158 which are defined at the junctures of the recess portions 146 with the recess portions 152. A cylindrical pin 160 of hardened steel or similarly hard and tough material is received in each well 154, a coil spring 162 first having been inserted in each well. A threaded plug 164 received in each well below the pin 160 therein retains the pin in the well and forces it against the spring 162 causing partial compression of the latter for a purpose to be explained hereinafter. According to the present invention, a generally cylindrically curved, outwardly concave surface 166 is milled or otherwise formed on each pin 160 intermediate the ends thereof on the portion of each pin which is exposed by virtue of a recess 144 narrower portion 152. In the embodiment shown, the surface 166, at its horizontal center line extends in an imaginary plane which is angled at 18.5 degrees from the longitudinal axis of the core through passage.

The core peripheral surface is relieved on the opposite side of each pin 160 from the recess narrower portion 152 associated therewith, by a surface substantially coplanar with the surface 166 at the horizontal center line of the surface 166 (see FIGURES 4a–9a, 10).

The core portion 116 is circumferentially surrounded by the ball carrier 104, the latter being generally annular. As shown in FIGURE 3, the top of the ball carrier 104 is flush with the core portion 116 but the lower end thereof terminates approximately flush with the upper extent of the flats 142. A first pair of diametrically opposed radially extending openings 168 formed through the ball carrier are axially alignable with the housing flow passageway and core flow passageway in the open condition of the valve. A second pair of diametrically opposed radially extending openings 170, whose longitudinal centerline lies in the plane of that of the first openings 168, is formed through the ball carrier. The centerlines just mentioned extend non-perpendicularly with respect to one another so that proceeding counterclockwise from one opening 168 to the nearest opening 170 an arc of less than 90 degrees traversed. The feature just mentioned allows the valve to be brought from a fully open to a fully closed and locked position by rotating the valve stem less than 90 degrees as will become apparent. The peripheral surfaces of the openings 170 are generally cylindrical and approximately equal in radius to the radius of the balls 106 which are slidably received therein.

The core and carrier keying and stop assembly 110, best seen in FIGURES 3 and 4b–9b includes an arcuate body ball carrier stop 172 mounted in the groove 84 by bolts 173 so as to extend approximately 160 degrees therealong and extend radially inwardly a short distance beyond flushness with the bore cylindrical portion 90. The portion of the stop 172 so extending has a flat upper surface 174 upon which the ball carrier is supported. The assembly 110 also includes one core and carrier keying block 176, a forward ball carrier stop limit block 178 and a return ball carrier stop limit block 180. The blocks 176, 178 and 180 are secured to the bottom of the ball carrier 104 by bolts 181 extending through slots (not shown) in the blocks in order to permit some adjustment of the relative positioning of the blocks. The blocks 176, 178 and 180 are spaced approximately 120 degrees from each other, the block 180 has a radially outer extent which is less than the radially inner extent of the stop 172 and the blocks 176 and 178 have a radially outer extent which is greater than the radially inner extent of the stop 172. Accordingly, rotation of the core 102 is limited by the abutment of the blocks 176 and 178 with opposite ends of the stop 172. In addition, the blocks extend sufficiently into the groove 84 to contact the lower surface thereof and thus aid the stop 172 in supporting the ball carrier.

As best seen in FIGURES 4b–9b the core and carrier keying block 180 inner radially inner surface includes two planar segments 182, 184 tapered backwardly from a central apex 186 at their juncture so that the block is narrowest at its lateral margins and widest at its center. The block 180 is oriented on the ball carrier so that its apex 186 lies adjacent the center of one flat 142.

The relative orientation of the members of the core and carrier keying and stop assembly 110, the core 102 the ball carrier 104, balls 106 and valve seats 108 during the operation of the valve is best seen by comparing FIGURES 3, 4a–9a and 4b–9b. The valve is shown having its operating components in a position intermediate that shown in FIGURES 4a, 4b and 5a, 5b so that the flats 142 appear as edges. The FIGURE 4a corresponds with FIGURE 4b, etc., so that the operating components can all be seen for each step in the valve's operation. For convenience each of the views 4a–9a and 4b–9b have been labeled with the condition of the valve in which such relative orientation is present. When the valve is in a closed and locked condition, the balls are backed up by the locking pins carried by the core 102 and are forced into sealing engagement with the valve seats. As the valve stem is turned to open the valve the locking pin tapered surfaces slide away from the balls. In so turning the valve core (counterclockwise) the surface segment 182 contacts the flat 142 adjustment thereto on the valve core. As this is accomplished the fluid passageway of the valve core becomes aligned with the fluid passageway of the ball carrier because of the relative movement of the former with respect to the latter. Abutment of the segment 182 and the flat 142 (FIGURES 5a, 5b), prevent further relative rotation and the force of turning is then transmitted via the block 180 to the ball carrier so that it turns with the core 102. As the ball carrier turns it in turn applies a force to the balls thereby creating a resultant force on one side of each valve seat. This force causes the balls to be driven into the recesses in the core which have been exposed by the initial movement of the core with respect to the ball carrier. As shown in FIGURES 6a and 6b, the balls retreat sufficiently into the ball carrier that they are flush with the exterior thereof and the carrier can be rotated sufficiently that the balls no longer are adjacent the valve seats. Upon further rotation of the valve stem the whole assembly including the core, balls, ball carrier and stop limit blocks 176, 178 moves as a unit until the forward stop limit block 176 abuts one end 188 of the body ball carrier stop 172 (FIGURES 7a and 7b).

Closing of the valve is effected by turning the valve core 102 clockwise. This turning transmits a force from the core through the locking pins 160 to the balls 106. The whole assembly including the core 102, ball carrier 104 and balls 106 rotates as a unit (FIGURES 8a, 9a, 8b, 9b) until the balls 106 are adjacent their respective seats 108. As the return stop limit block abuts the second end 190 of the body ball carrier stop 172 further rotation of the ball carrier is prohibited. Continued rotation of the valve core 102 effects locking of the valve bringing it to its FIGURE 4a, 4b position wherein the balls are wedged tightly into their seats 108 as the locking pin tapered portions slip behind the balls in a wedge-like fashion. At this point the core and carrier keying block 180 segment 184 contacts the flat 142. The partly compressed springs 162 allow limited vertical movement of the pins 160 to center the tapered surfaces thereon with respect to the balls. The keys 192 prevent rotation of the pins 160.

Although the valve just described has been illustrated as having two ports and two balls it should be recognized that the principles herein explained are applicable to valves having one or more balls and correspondingly modified cores and ball carriers.

In summary, in the forward or opening sequence of the valve 10, the locking force is first removed from behind the balls by movement of the core; force is then transmitted from the core through the ball carrier to the balls forcing them to retract as the low differential pressure across the balls enables the ball carrier to push the balls off their seats.

In the return or closing sequence of the valve 10, the balls are clamped between the cylindrical wall of the bore portion 90 and the valve core, the balls being clamped at an angle $\theta$ defined as the angle between a radius drawn from the center of a ball to the point of contact with the bore surface 90 and a radius drawn from the center of the same ball to the point where the valve core contacts the ball. It can be calculated that one-half the tangent of the angle $\theta$ multiplied by the normal force applied on the ball by turning the valve stem plus the net frictional forces acting on the ball equals the resultant closing force. The closing action just described can be compared to the action of a pair of scissors clamping on a glass marble and causing the marble to move forward away from the pivot toward the tips as a function of the angle of bite of the scissors on the marble.

An advantage of the method of opening and closing of the valve as just described is that a small turning force is all that is necessary. Thus the valve 10 may be utilized where small turning forces are required because of the size of the valve stem, its seals, and the bearings due to the high pressure incumbent upon the valve. For instance, the valve shown can be utilized in a closed system between the discharge of a high pressure gas compressor and a reaction vessel wherein pressures in the range from 15,000–40,000 p.s.i. are incumbent upon the valve.

In addition, the internal parts of the valve 10 which are exposed to high pressure can be allowed to have such liberal tolerances that the valve housing 12 can be cold worked by adapting the technique of auto frettage to the interior of the housing without effecting the intended operation of the valve because of dimensional changes. The auto frettage extends the fatigue life of the pressure containing parts of the valve. By using two balls and seats the flow through the valve can be stopped quickly in either direction by turning the stem less than 90 degrees according to the preferred embodiments shown. The principle of the self-aligning balls and locking pins provides for the valve 10 the ability to adjust to movement of the seats caused by temperature induced expansion or contraction and strain movements caused by high pressure on the parts.

Rather than utilizing the preferred wedge type closure 30, the valve housing 12 could be closed by a sealing arrangement such as is shown in Watts et al. U.S. Patents 2,766,829, 2,766,998 and 2,766,999 or more conventional, though more cumbersome, closure means.

It should now be apparent that the valve disclosed herein efficiently acomplishes each of the invention's objects stated hereinbefore, and well illustrates the principles and scope of applicability of the present invention. Because the illustrative embodiment shown can be considerably modified without departing from these principles the present invention should be understood as encompassing all such modifications as are within the spirit and scope of the following claims.

We claim:

1. A valve comprising a housing; means defining a flow passage through said housing; means defining a chamber in said housing, said chamber intersecting said flow passage intermediate the ends of the latter; a valve core received in said chamber; means defining a flow passage through said core; said core being rotatable in said chamber between a first position wherein said core flow passage is aligned with said housing flow passage and a second position wherein said core flow passage is entirely blocked from communication with said housing flow passage; a locking and sealing element; an annular locking and sealing element carrier mounted in said chamber surrounding and carried by said valve core; means defining a flow passage radially through the locking and sealing element carrier; means defining at least one radially outwardly opening socket in said locking and sealing element carrier angularly between outer ends of said flow passage of said locking and sealing element carrier; said socket communicating between said core and the exterior of said locking and sealing element carrier; said locking and sealing element being slidingly received in said socket; means defining a radially outwardly facing recess in said core angularly between outer ends of said flow passage of said core adapted to receive a radial portion of said locking and sealing element; means on said core mounted in said recess toward one angular extreme of said recess and obstructing the radial depth of said recess; means keying said carrier to said core for limited angular slippage relative thereto between a first extreme wherein an unobstructed portion of said recess lies radially adjacent said socket and a second extreme wherein said recess obstructing means lies radially adjacent said socket, said first and second extremes corresponding, respectively, to said first and second positions of said core; said obstructing means being constructed and arranged for urging said locking and sealing element partly radially outwardly of said carrier socket into said housing flow passage upon rotation of said core to said second position, said locking and sealing element being withdrawn from said housing flow passage and partly received in said recess upon initiation of rotation of said core from said second position thereof toward said first position thereof via said limited angular slippage of said carrier.

2. A valve as set forth in claim 1 wherein said locking and sealing element comprises a spherical ball having a greater radius than said housing flow passage.

3. A valve comprising: a housing, means defining a flow passage through said housing, means defining a chamber in said housing, said chamber intersecting said flow passage intermediate the ends of the fluid passage; annular valve seats mounted in said housing at the intersection of the chamber and said flow passage; a valve core received in said chamber for rotation therein about the longitudinal axis of said valve core, means defining a flow passage through said valve core; a ball carrier mounted in said chamber at least partly peripherally surrounding said valve core, means defining a flow passage through said ball carrier; means defining at least one radially outwardly facing socket in said ball carrier; a first ball-like element received in said socket for radial movement therein; means on said core engageable with said ball-like element to force said ball-like element radially outwardly into engagement with one of said valve seats upon closing of the valve to block said valve seat and lock the valve in a closed position; and means for selectively keying said ball carrier to said valve core to effect alignment of the housing, valve core and ball carrier flow passage upon rotation of the valve in a first sense and for disengaging said ball carrier from said valve core upon rotation of the valve in a second sense.

4. A valve as set forth in claim 3 wherein said ball carrier includes a second radially outwardly facing socket diametrically opposed from the first mentioned socket; a second ball-like element received in said second socket for radial movement therein; means on said core engageable with said second ball-like element to force said second ball-like element radially outwardly into engagement with another of said valve seats upon closing of the valve; said first mentioned and second sockets being axially aligned, the longitudinal axes of said sockets and said ball carrier flow passage extending at an acute angle to one another whereby said valve can be alternated between opened and closed positions thereof by rotation of said ball carrier through said acute angle.

5. A valve as set forth in claim 3 wherein said one valve seat is lapped peripherally of the inner end thereof, and wherein the ball-like element is substantially spherical being adapted to engage the lapped portion of said one valve seat.

6. A valve as set forth in claim 3 further comprising means defining a radially outwardly opening recess in said core arcuately adjacent said forcing means, said ball-like element being partially withdrawable into said recess upon opening said valve to thereby remove said ball-like element from a blocking condition with respect to said one valve seat.

7. A valve as set forth in claim 6 wherein said forcing means comprises a pin of hard metal received in means defining a generally vertically directed well in said core adjacent and communicating with the outer periphery of the core.

8. A valve as set forth in claim 7 wherein said pin is generally cylindrical, having means defining a groove therein intermediate the ends thereof, said groove being arcuate about a generally horizontal axis perpendicular to a radius of said core, said recess being most shallow at the arcuate end thereof spaced furthest from said pin and said recess extending from said arcuate end beyond the midpoint of the vertical axis arc defined between the intersections of the opposite ends of said core flow passage with the outer periphery of said core.

9. A valve as set forth in claim 8 wherein an angle of at least approximately 22 degrees is subtended between radii of said core which intersect said midpoint and the longitudinal axis of said pin.

10. A valve as set forth in claim 8 wherein said well has a mouth which communicates with an end of said core; resilient means received in said well and engaging one end of said pin; plug means received in said well mouth partially compressing said resilient means and retaining said pin in said well, whereby said pin is longitudinally movable in said well to a limited degree to center said groove therein with respect to said ball like element.

11. A valve as set forth in claim 3 further including a valve stem extending coaxially from one end of said core, means defining a generally cylindrical opening through said housing communicating with said chamber and through which said valve stem projects from said housing, means defining an enlargement in said cylindrical opening adjacent said chamber; packing material received in said enlargement peripherally of said valve stem; and means receivable in said enlargement from the end thereof communicating with said chamber for expanding said packing.

12. A valve as set forth in claim 11 further including means defining an access port in said housing communicating with said chamber coaxially with said cylindrical opening and located at the opposite end of said chamber from said cylindrical opening; a removable closure disk receivable in said port, cooperative sealing means on said disk and on said housing peripherally of said port for sealingly blocking said port; a relatively stiff closure disk cover assembly; cooperative means on said housing peripherally of said port and on said cover for forcing said disk toward said chamber to interengage said cooperative sealing means.

13. A valve as set forth in claim 12 further including an annular axially directed flange on said closure disk facing said chamber; and annular bearing means supported on said closure disk and located thereon by said flange, said bearing means supporting said core for rotation.

14. A valve as set forth in claim 12 wherein said cooperative sealing means comprises a radially inwardly facing frusto-conical sealing surface on said housing peripherally of and coaxial with said port and an axially directed annular lip on said disk, coaxial with said disk and facing said chamber, means defining a radially outwardly facing frusto-conical sealing surface on said lip, the first mentioned and second mentioned frusto-conical sealing surfaces being substantially coextensively engageable.

References Cited
UNITED STATES PATENTS

| | | | |
|---|---|---|---|
| 1,044,124 | 11/1912 | Bessert | 251—158 X |
| 1,149,057 | 8/1915 | Hudson | 251—199 X |
| 1,882,136 | 10/1932 | Freeze | 251—167 |
| 2,650,059 | 8/1953 | Hjulian | 251—192 |
| 2,879,798 | 3/1959 | Anderson | 251—163 X |

CLARENCE R. GORDON, *Primary Examiner.*